UNITED STATES PATENT OFFICE.

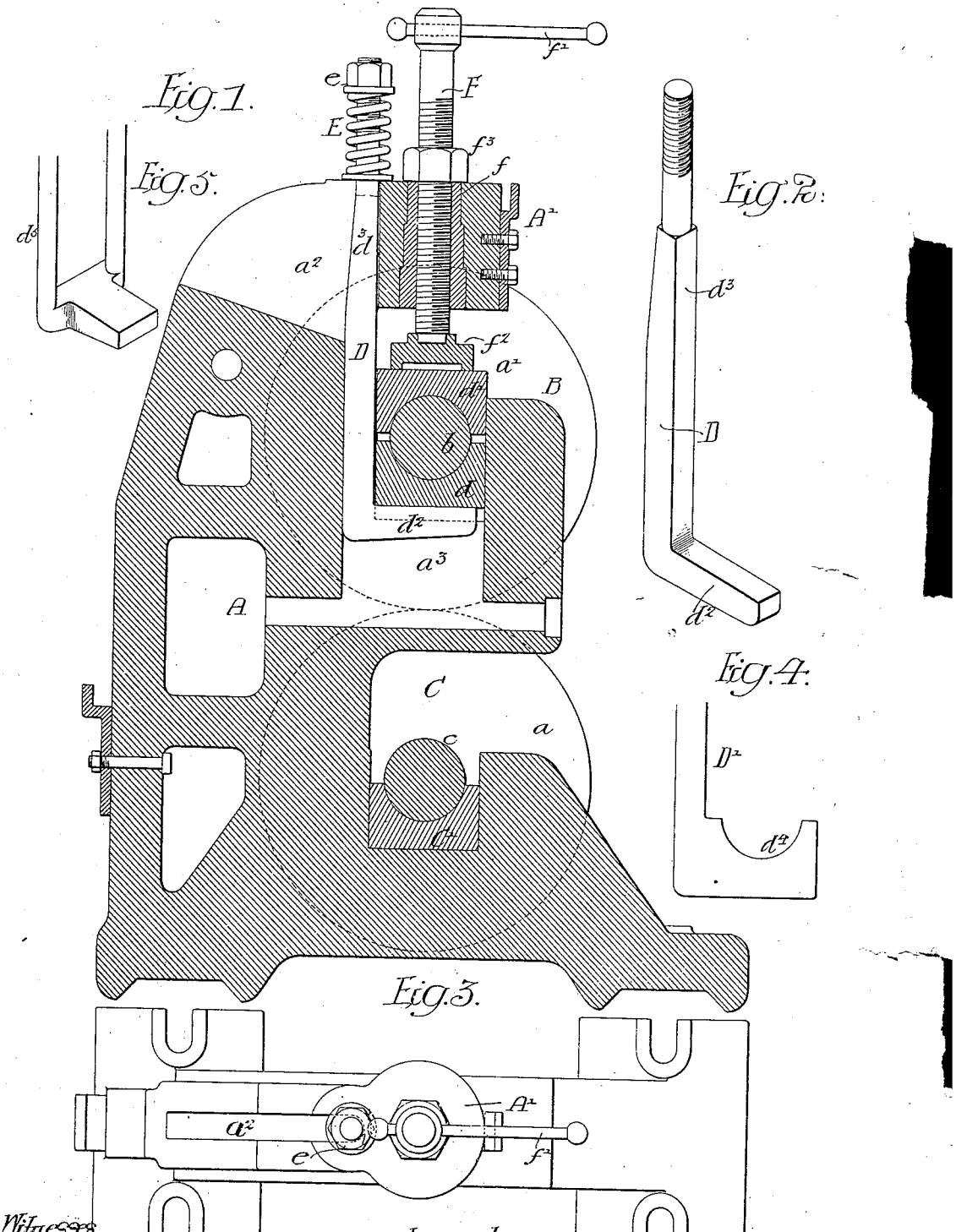

JOHN S. WORTH, OF COATESVILLE, PENNSYLVANIA, ASSIGNOR OF ONE-HALF TO WILLIAM P. WORTH, OF COATESVILLE, PENNSYLVANIA.

BEARING.

No. 891,649.  Specification of Letters Patent.  Patented June 23, 1908.

Application filed February 3, 1906. Serial No. 299,313.

*To all whom it may concern:*

Be it known that I, JOHN S. WORTH, a citizen of the United States, residing at Coatesville, Pennsylvania, have invented certain Improvements in Bearings, of which the following is a specification.

The object of my invention is to make an adjustable bearing for a roll trunnion or shaft, in which the lower half of the box is supported in such a manner that the trunnion or shaft can be removed through an opening in the front of the housing or other support.

In the drawings I have shown a tube mill having a housing with openings in front for the removal of the trunnions of the rolls, the lower roll in the present instance being mounted in a fixed bearing and the upper roll being mounted in adjustable bearings, but it will be understood that the invention can be applied to other types of rolling mills or, in fact, any machine where it is desired to adjustably support the lower box of a shaft or trunnion and at the same time allow for its removal.

In the accompanying drawing:—Figure 1, is a vertical sectional view through a tube mill housing, illustrating my invention; Fig. 2, is a perspective view of the hooked supporting bar; Fig. 3, is a plan view of the structures shown in Fig. 1; Figs. 4 and 5, are views of modifications.

In the present instance A is the housing of a tube welding mill, this housing is shaped to receive the box C' of the lower roll C, the trunnion c of which is mounted in this half box. The housing is open at $a$ so that the roll and its trunnion can be removed. The boxes $d$, $d'$ in which are mounted the trunnions $b$ of the upper roll B are mounted in the housing and the housing is open at $a'$ for the removal of the trunnions $b$ of the said upper roll. The half boxes $d$, $d$ are arranged to slide in ways in the housing, so that they can be adjusted towards and from the lower roll. There is an opening $a^3$ in each housing below the box $d$ and there is also a space back of the boxes which communicates with the space $a^2$ in the upper portion of the housing.

In order to support the lower half box $d$ I provide a hooked bar D, the hooked portion $d^2$ of the bar extends under the half box $d$, as shown in Fig. 1, while the shank $d^3$ extends up back of the box and back of the upper overhanging bearing A', this shank is screw threaded and on the threaded portion is a nut $e$. A spring E is mounted between the nut and a washer on the housing and tends to relieve the hooked bar and its box $d$.

F is an adjusting screw having a threaded portion adapted to a nut $f$ in the overhanging portion A', and this screw has a handle portion $f'$ and bears on a plate $f^2$ resting on the upper box $d'$. On the screw is a jam nut $f^3$ for locking the screw in the position to which it is adjusted. By turning the screw F in one direction both the half boxes $d$, $d'$ with the roll B will be forced down, compressing the spring E, but if the screw F is turned in the opposite direction the spring E will lift both half boxes and the upper roll B keeping the upper box always in contact with the adjusting screw. When it is desired to remove the parts the screw is turned so as to allow the upper half box to be removed, then the roll is removed, the trunnions passing out through the openings $a'$, the lower half box is then removed and the hooked bar can be raised and tilted so as to either be removed from the front of the machine through the openings $a'$ or from the back of the machine through the openings $a^2$. Thus the parts can be readily removed from the housing or replaced therein very quickly and an accurate adjustment of the rolls can be made.

My invention can be applied to rolls of very small diameter as the adjusting mechanism is entirely removed from the space between the upper and lower roll bearings. In some instances the bar may be made an integral part of the box, as shown in Fig. 4, in which D' is the bar and $d^4$ is the hooked portion also forming the lower half box; or the bar may be attached rigidly to the half box. In some instances the hooked bar may be made as shown in Fig. 5, with two shanks, one extending on each side of the box back of the trunnion. A weighted lever may be substituted for the spring E, the lever being the equivalent of the spring.

I claim:—

1. The combination with a housing having an opening in front of a two-part box mounted in the housing, a shaft mounted in the box and so arranged that it can be removed through the front opening, a hooked bar mounted in the housing, the hooked portion of the bar extending under the lower half of the bearing, a spring tending to lift the hooked bar, and an adjusting screw mounted in the housing and bearing upon the block, substantially as described.

2. The combination with a housing having an opening in front, of a two-part box mounted in the housing, a shaft mounted in the box and adapted to be removed through the front opening, a hooked bar in the housing, the hooked portion extending under the box, the body of the bar extending up through the housing, a nut on the end of the bar, a spring mounted on the bar between the nut and the housing tending to elevate the box, and an adjusting screw mounted in the housing above the bearing and arranged to adjust the said bearing, substantially as described.

3. The combination of a housing having two openings in front, with two boxes mounted in the housing, a shaft mounted in each box, each shaft being so arranged that it can be removed through a front opening, an upper bearing block made in halves, the housing having a cavity back of the bearing block, a hooked bar mounted in the cavity, the hooked portion of the bar extending under the lower half of the upper bearing block, a spring on the bar tending to lift the said hooked bar and the bearing, with an adjusting screw mounted on the upper portion of the housing and bearing upon the upper half of the upper bearing block whereby the upper bearing can be adjusted towards and from the lower bearing, substantially as described.

4. The combination with a housing having a body portion an overhanging bearing, an opening back of said bearing, a cavity near the body portion in said housing, and an opening in front directly below the overhanging bearing, of two half boxes mounted in the cavity, a hooked bar extending back of the box and having a hooked portion extending under the lower box, a spring acting to lift the hooked bar, and an adjusting screw mounted in the overhanging bearing and resting on the upper box, the parts being so arranged that the trunnion or shaft can be removed from the front of the housing and the hooked bar can be removed, substantially as described.

In testimony whereof, I have signed my name to this specification, in the presence of two subscribing witnesses.

JOHN S. WORTH.

Witnesses:
WILLIAM S. G. COOK,
S. G. COOK.